(No Model.)

S. J. WARNER.
NUT LOCK.

No. 390,146. Patented Sept. 25, 1888.

Witnesses
W. Rossiter
Fred. H. Wells

Inventor
Sumner J. Warner
By Merriam & Whipple
Attys

UNITED STATES PATENT OFFICE.

SUMNER J. WARNER, OF CHICAGO, ILLINOIS.

NUT-LOCK.

SPECIFICATION forming part of Letters Patent No. 390,146, dated September 25, 1888.

Application filed December 2, 1887. Serial No. 256,748. (No model.)

*To all whom it may concern:*

Be it known that I, SUMNER J. WARNER, of Chicago, Illinois, have invented certain new and useful Improvements in Nut-Locks, of which the following is a specification.

The improvement relates to means for securing a nut upon the threaded portion of its bolt so as to prevent looseness or displacement in use; and the invention consists in the construction hereinafter described and claimed.

The accompanying drawings illustrate the invention.

Figure 1:
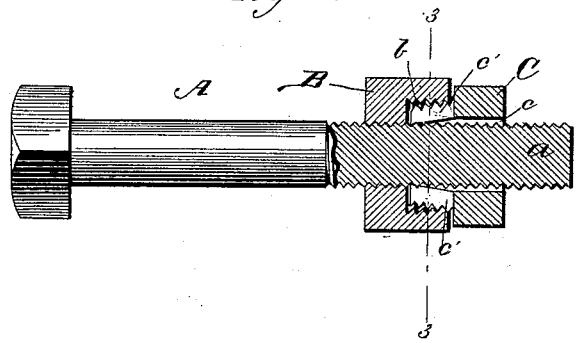
Figure 2:
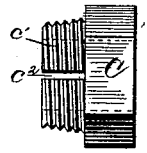
Figure 4:
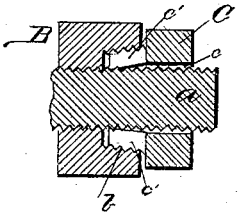
Figure 5:
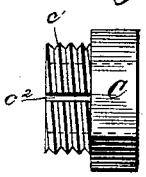
Figure 3:
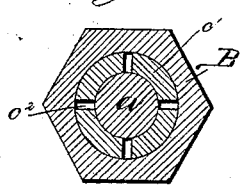

Figure 1 is a central longitudinal section through the nut and its bolt with the locking-piece. Fig. 2 is a side view of the locking-piece. Fig. 3 is a cross-section on line 3 3 of Fig. 1. Figs. 4 and 5 show modifications.

A designates the bolt, having the threaded end $a$ of any ordinary construction.

B is the nut. The nut is provided with a threaded recess, $b$, on the top or side opposite to the one which applies the force or does the required work.

The locking device consists of a hollow piece, C, the bore $c$ of which is smooth, as contradistinguished from threaded, and of the proper size to just pass freely over the thread of the bolt. The part $c'$ is provided with slots $c^2$, to allow the bore to be contracted at the slotted part, and is screw-threaded exteriorly to correspond with the female thread of the recess $b$. This slotted part is made to clamp the bolt by being screwed into the recess, the clamping effect being produced either by a taper on the exterior of part $c'$, as shown in Fig. 2, used with a cylindrical or parallel sided recess, as shown in Fig. 1, or by a tapering recess, as shown in Fig. 4, used with a straight slotted part, as shown in Fig. 5. The locking-piece is made of spring-metal, so that the slotted end, after being withdrawn from the recess of the nut, will expand and release its pressure on the bolt.

The loosening of nuts is due to strain or pressure against an incline, and is effected by jarring and vibrations acting upon such incline. Many devices have been constructed to prevent the backward rotation of screw-threaded nuts, including many forms of double nuts acting one within or against the other; also, by using several threads of different or reverse pitch. In all of these devices heretofore employed having a structure somewhat resembling mine the principle of operation consists in causing the threads of the nut to more completely enter and fill the threads of the bolt with compression, or to cause a longitudinal strain by opposing one set of threads to another. My device, however, operates upon a different and a new principle—to wit, an exterior circumferential pressure independent of the incline or pitch of the threads, whereby the tendency to yield or move backward upon the bolt-threads is avoided, as the lock has no threads or inclines corresponding with those of the bolt upon or against which the threads of the bolt can act. The bolt-threads simply serve as a roughened surface to prevent movements along the length of the bolt, while the clamping-lock furnishes an abutment for supporting the nut in place and preventing its backward rotation, and, owing to the slight taper of the recess and the clamping-lock and the slits in the lock, the bolt-threads, if sharp edged, are flattened or compressed.

What I claim, and desire to secure by Letters Patent, is—

The clamping-lock C, having an unthreaded interior bore, $c$, and a slitted and exteriorly-threaded end, $c'$, in combination with the nut B, having bolt-engaging threads and an enlarged threaded recess, $b$, substantially as and for the purpose specified.

SUMNER J. WARNER.

Witnesses:
HARRY E. DENISON,
JAMES R. DEAN,